United States Patent
Araujo (12) 
(10) Patent No.: US 6,327,662 B1
(45) Date of Patent: Dec. 4, 2001

(54) SECURITY THROUGH THE USE OF TOKENS AND AUTOMATICALLY DOWNLOADED APPLETS

(75) Inventor: Kenneth Araujo, Sunnyvale, CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/164,209

(22) Filed: Sep. 30, 1998

(51) Int. Cl.[7] ........................................ H04L 9/00
(52) U.S. Cl. ...................... 713/200; 713/200; 713/201
(58) Field of Search ................................ 713/200, 201

(56) References Cited

U.S. PATENT DOCUMENTS 5,958,051 * 9/1999 Renaud et al. .................. 713/200
6,247,133 * 6/2001 Palage et al. .................... 713/201

* cited by examiner

Primary Examiner—Ly V. Hua
(74) Attorney, Agent, or Firm—Wagner, Murabito & Hao LLP (57) ABSTRACT

A method and system for providing security during use of an intermediate device which represents clients to a central site. In one embodiment of the invention, an intermediate device includes memory. The memory of the intermediate device is adapted to a store a deliverable security applet. Additionally, the intermediate device is configured to download the deliverable security applet to a desired location. The present embodiment also includes a client which is coupled to the intermediate device. The client is adapted to receive the deliverable security applet from the intermediate device when the intermediate device downloads the deliverable security applet to the client. In so doing, the client can be prompted to respond to requests for authentication of the client when the requests for authentication of the client are received by the intermediate device.

28 Claims, 5 Drawing Sheets

SECURITY THROUGH THE USE OF TOKENS AND AUTOMATICALLY DOWNLOADED APPLETS

TECHNICAL FIELD

The present invention generally pertains to the field of computer networking. More particularly, the present invention is related to and intermediate device representing clients to a central site.

BACKGROUND ART

Computers have become an integral tool used in a wide variety of different applications, such as in finance and commercial transactions, computer-aided design and manufacturing, health-care, telecommunication, education, etc. Computers are finding new applications as a result of advances in hardware technology and rapid development in software technology. Furthermore, a computer system's functionality is dramatically enhanced by coupling stand-alone computers together to form a computer network. In a computer network, users may readily exchange files, share information stored on a common database, pool resources, and communicate via e-mail and via video teleconferencing.

Computer networks can be arranged in numerous configurations comprising a variety of network types. Some of the most popular types of networks comprise Ethernet (coaxial cable or twisted-pair cable), token ring, Fiber Distributed Data Interface (FDDI), Frame Relay, Integrated Services Digital Network (ISDN), X.25, Synchronous Data Link Control (SDLC). Typically, these networks are arranged in local area networks (LANs) and wide area networks (WANs). Usually, LANs are distinguished from WANs based upon the geographical area they cover and sometimes the number of users connected to the network. For example, a group of personal computers (PCs) in a home or single business site (location) usually communicate with each other over a LAN. Groups of PCs disposed remote from one another, such as those in different homes, different companies, or different branch offices of the same company, typically communicate with each other over a WAN.

There has been an immense increase in the number of separate networks and the number of users communicating over these various networks. This growth has resulted in a tremendous need for connectivity capacity and the ability to accurately transmit information to an address corresponding to a particular PC or "client". One approach that effectively expands address capacity is to provide address translation through a Network Address Translator (NAT).

Typically, a NAT is associated with a primary LAN and facilitates the transmission of communication from the primary LAN to a central site (e.g. a Remote Access Server (RAS) at an Internet Service Provider (ISP)). Specifically, the NAT allows several clients to share a common single connection to an ISP, thereby reducing the number of connections necessary to couple the numerous clients in the LAN to the ISP. Additionally, by allowing the numerous clients of the LAN to access the ISP over a single common connection, the NAT reduces the costs associated with coupling the numerous clients to the ISP. More specifically, instead of paying for a separate and distinct ISP account for each client in the LAN, only a single account (to connect the NAT to the ISP) need be purchased. Also, only a single globally routable Internet Protocol (IP) address is needed to be assigned by the RAS.

In operation, a conventional NAT translates a primary LAN address for a client to another network address associated with the NAT. A NAT performs an address translation by mapping an address of the primary LAN to an address in another network. For example, a user on a PC attached to a LAN may have a particular LAN address but that LAN address would not necessarily be valid if the user tried to utilize the LAN address as an Internet Protocol (IP) source address when communicating with an ISP over a WAN. Thus, one function a NAT typically provides is translation between a local LAN address (e.g. a local IP address) and a WAN address (e.g., an ISP designated source IP address). It will be understood that the primary LAN address for a client on the LAN does not typically change. On the other hand, a temporary IP source address provided by an ISP will, typically, change from session to session. There are numerous well-known NAT mapping techniques including static, dynamic, masquerading, etc. which are utilized in differing situations to meet a variety of design criteria.

Although conventional NATs have several advantages associated therewith, conventional prior art NATs also have significant drawbacks associated therewith. As an example, a particular client may seek to establish a link to, for example, a Remote Access Server (RAS). Alternatively, the NAT automatically establishes such a link when the user attempts to access a non-local internet site. In such cases, the NAT device interacts (i.e. establishes a link) with the RAS on behalf of the client. However, many RASs may require client authentication. Such a request for client authentication will be received by the NAT, but can only be properly responded to by the client or a user thereof. Hence, the NAT must, in some manner, communicate the received request for authentication to the appropriate client. Many conventional NATs are simply unable to convey such a request for authentication to the appropriate client. As a result, the RAS will not communicate with the NAT and, in turn, the client.

In one prior art attempt to solve this problem, each client on the LAN which is coupled to the NAT has a special application (e.g. a Terminate-and-Stay-Resident program) installed thereon. This prior art approach has several substantial disadvantages. First, a unique version of the special application must be written and installed for each client environment (i.e. the operating system of the client). That is, one version of the special application must be written for and installed on clients running, for example, Windows NT™. Another version of the special application must be written for and installed on clients running, for example, Windows 95™. Still another version of the special application must be written for and installed on clients running, for example, Windows 98™, and so on. This requirement is costly and time-consuming. Furthermore, the clients must be monitored and a new version of the special application must be installed thereon if the client environment changes (e.g. a client environment of Windows 95™ is updated to Windows 98™, and so on).

Finally, the requirement to monitor the client environment and install (and update) various versions of the special application demands extensive user intervention and also demands a level of sophistication which is beyond the scope of the ordinary consumer.

Thus, a need exists for a method and system for providing security during use of an intermediate device wherein the method and system allows a user of a client to be prompted for authentication information. A further need exists for a method and system which meets the above-listed need and which is independent of the operating system environment of the client to be authenticated. Yet another need exits for a method and system which meets the above listed needs and which does not require extensive consumer intervention or consumer sophistication.

DISCLOSURE OF THE INVENTION

The present invention provides a method and system for providing security during use of an intermediate device wherein the method and system allows a user of a client to be prompted for authentication information. The present invention also provides a method and system which meets the above-listed need and which is independent of the operating system environment of the client to be authenticated. The present invention further provides a method and system which meets the above listed needs and which does not require extensive consumer intervention or consumer sophistication.

Specifically, in one embodiment, an intermediate device includes memory. The memory of the intermediate device is adapted to a store a deliverable security applet. Additionally, the intermediate device is configured to download the deliverable security applet to a desired location. The present embodiment also includes a client which is coupled to the intermediate device. The client is adapted to receive the deliverable security applet from the intermediate device when the intermediate device downloads the deliverable security applet to the client. In so doing, the client can be prompted to respond to requests for authentication of the client when the requests for authentication of the client are received by the intermediate device.

In another embodiment, the present invention includes the features of the above-described embodiment and further recites that the intermediate device is a Network Address Translator (NAT).

In still another embodiment, the present invention includes the features, of the first above-described embodiment and further recites that the deliverable security applet is adapted to run on multiple client operating systems.

These and other advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should be understood as not being drawn to scale except if specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "storing", "downloading", "prompting", "running" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

COMPUTER SYSTEM ENVIRONMENT OF THE PRESENT INVENTION

Figure 1:
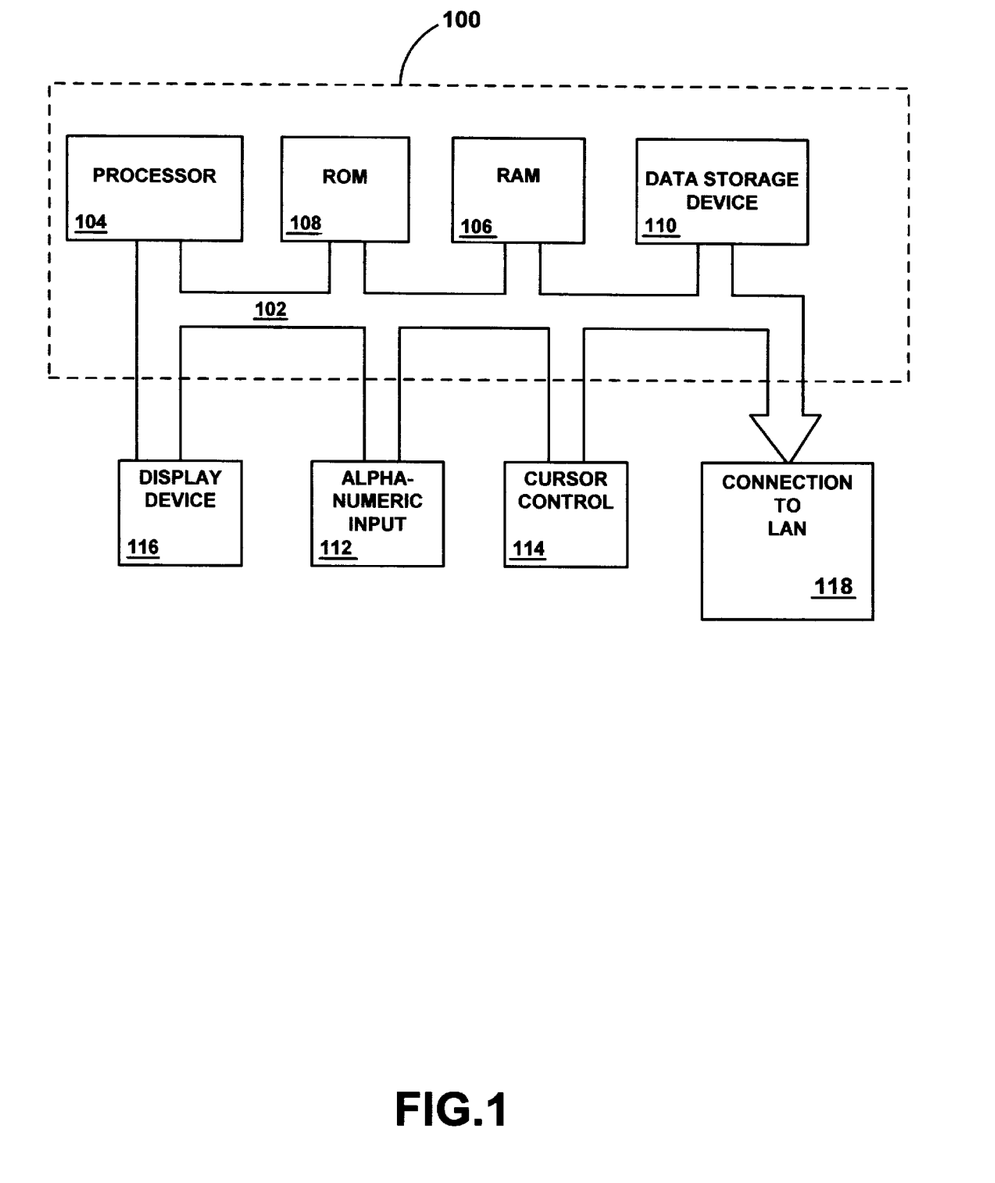
FIG. 1 is a schematic diagram of an exemplary computer system used to perform steps of the present method in accordance with one embodiment of the present invention.

With reference now to FIG. 1, portions of the present method and system are comprised of computer-readable and computer-executable instructions which reside, for example, in computer-usable media of a computer system. FIG. 1 illustrates an exemplary computer system 100 used to perform the present invention. It is appreciated that system 100 of FIG. 1 is exemplary only and that the present invention can operate within a number of different computer systems including general purpose networked computer systems, embedded computer systems, and stand alone computer systems. Furthermore, as will be describe d below in detail, the components of computer system 100 reside, for example, in a client computer and/or in the intermediate device of the present system and method. Additionally, computer system 100 of FIG. 1 is well adapted having computer readable media such as, for example, a floppy disk, a compact disc, and the like coupled thereto. Such computer readable media is not shown coupled to computer system 100 in FIG. 1 for purposes of clarity.

System 100 of FIG. 1 includes an address/data bus 102 for communicating information, and a central processor unit 104 coupled to bus 102 for processing information and instructions. Central processor unit 104 may be an 80×86-family microprocessor. System 100 also includes data storage features such as a computer usable volatile memory 106, e.g. random access memory (RAM), coupled to bus 102 for storing information and instructions for central processor unit 104, computer usable non-volatile memory 108, e.g. read only memory (ROM), coupled to bus 102 for storing static information and instructions for the central processor unit 104, and a data storage unit 110 (e.g., a magnetic or optical disk and disk drive) coupled to bus 102 for storing information and instructions. System 100 of the present invention also includes an optional alphanumeric input device 112 including alphanumeric and function keys is coupled to bus 102 for communicating information and command selections to central processor unit 104. System 100 also optionally includes a cursor control device 114 coupled to bus 102 for communicating user input information and command selections to central processor unit 104. System 100 of the present embodiment also includes an optional display device 116 coupled to bus 102 for displaying information. Additionally, computer system 100 of the present embodiment includes feature 118 for connecting computer system 100 to a LAN.

Referring still to FIG. 1, optional display device 116 of FIG. 1, may be a liquid crystal device, cathode ray tube, or other display device suitable for creating graphic images and alphanumeric characters recognizable to a user. Optional cursor control device 114 allows the computer user to dynamically signal the two dimensional movement of a visible symbol (cursor) on a display screen of display device 116. Many implementations of cursor control device 114 are known in the art including a trackball, mouse, touch pad, joystick or special keys on alphanumeric input device 112 capable of signaling movement of a given direction or manner of displacement. Alternatively, it will be appreciated that a cursor can be directed and/or activated via input from alphanumeric input device 112 using special keys and key sequence commands. The present invention is also well suited to directing a cursor by other means such as, for example, voice commands. A more detailed discussion of the method and system embodiments of the present invention are found below.

DETAILED DESCRIPTION OF THE STRUCTURE OF THE PRESENT INVENTION

Figure 2:
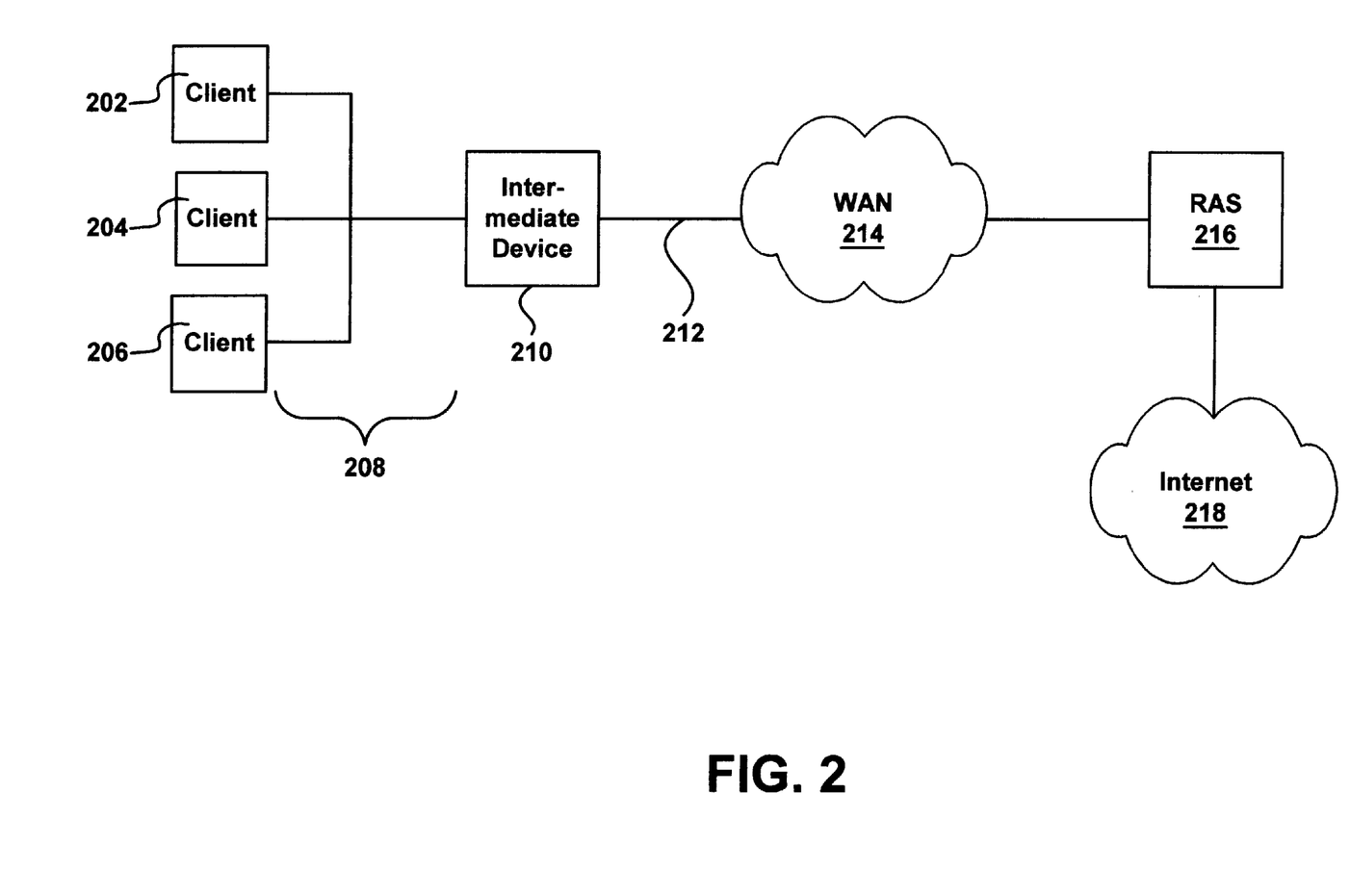
FIG. 2 is a schematic representation of a system for providing security during use of an intermediate device which represents clients to a central site in accordance with one embodiment of the present invention.

With reference now to FIG. 2, a system for providing security during use of an intermediate device which represents clients to a central site is shown in accordance with one embodiment of the present invention. The present discussion will begin with a detailed description of the structure and physical components of the embodiments of the present invention. The discussion will then describe, in detail, the operation of the embodiments of the present invention. Referring again to FIG. 2, the present embodiment includes several clients 202, 204, and 206. In the present embodiment, clients 202, 204, and 206 are personal computers (PCs), however, although the clients are PCs in the present embodiment, the present invention is also well suited to an embodiment in which clients 202, 204, and 206 are comprised of devices other than PCs (e.g. personal digital assistants, servers, and the like). Clients 202, 204, and 206 of the present embodiment may contain, for example, the features of computer system 100 described above in detail in conjunction with FIG. 1. Additionally, although only three clients 202, 204, and 206 are shown for purposes of clarity, the present invention is also well suited to a system having a greater or lesser number of clients.

With reference still to FIG. 2, clients 202, 204, and 206 are coupled together via a local area network (LAN) 208. In so doing, clients 202, 204, and 206 are able to communicate with each other. Although a LAN 208 is shown in the present embodiment, the present invention is also well suited to use with various other networks configurations such as, for example, a wide area network (WAN).

Referring still to FIG. 2, the present embodiment also includes an intermediate device 210. As shown in FIG. 2, intermediate device 210 is coupled to LAN 208. As a result, intermediate device 210 is able to communicate with each of clients 202, 204, and 206. In the present embodiment, intermediate device 210 is a network address translator (NAT). However, the present invention is also applicable to intermediate devices other than a NAT. Intermediate device 210 of the present embodiment may contain, for example, the features of computer system 100 described above in detail in conjunction with FIG. 1. Additionally, as shown in FIG. 2, intermediate device 210 is configured to be coupled via a single connection 212 to a WAN 214 and then to RAS 216. Thus, clients 202, 204, and 206 are able to access RAS 216 via intermediate device 210, single connection 212 and WAN 214. RAS 216 is, in turn, coupled to, for example, the internet 218. Although such a system is shown in FIG. 2, it will be understood that the present invention is also well suited to operating in a system which is configured differently than the system shown in FIG. 2.

Figure 3:
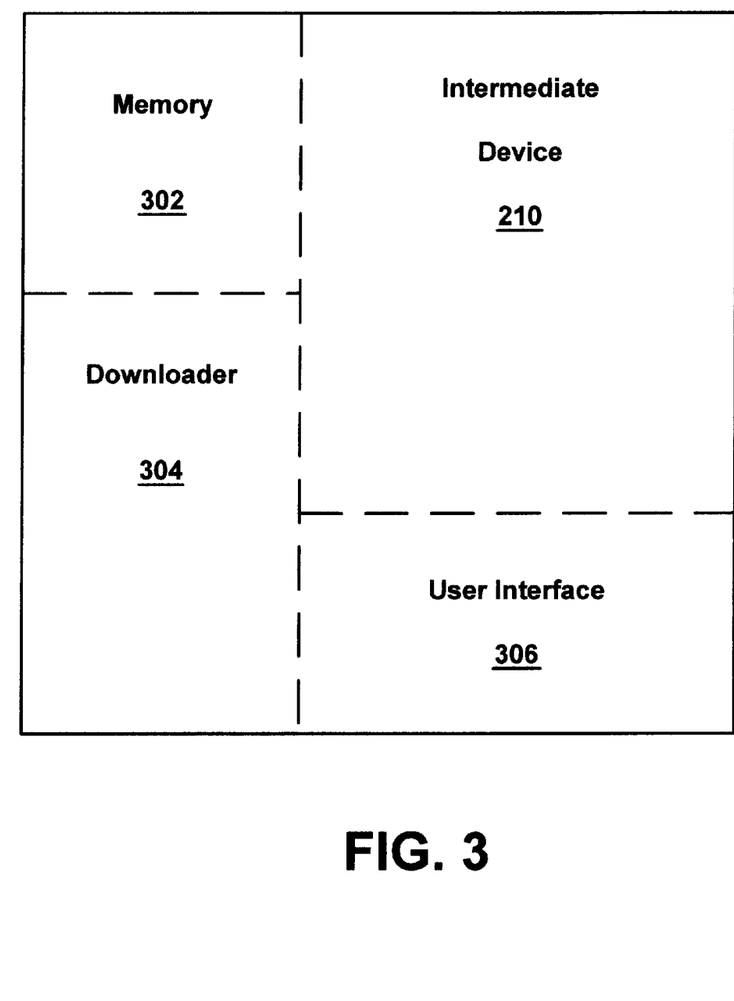
FIG. 3 is a schematic representation of an intermediate device for providing security during representation of clients to a central site in accordance with one embodiment of the present invention.

Referring now to FIG. 3, a schematic diagram of intermediate device 210 in accordance with one embodiment of the present invention is shown. In the present embodiment, intermediate device 210 includes memory 302, a downloader 304, and a user interface 306. Memory 302 of the present embodiment is adapted to a store a deliverable security applet therein. Downloader 304 is adapted to download the deliverable security applet from intermediate device 210 to a client(s) 202, 204, and 206 User interface 306 is adapted to allow a user of intermediate device to, for example, configure various operating parameters of inter-mediate device 306. In this embodiment, user interface 306 is, for example, a keypad, a display, and the like. The operation of the present embodiment including intermediate device 210 is set forth in detail below.

DETAILED DESCRIPTION OF THE OPERATION OF THE PRESENT INVENTION

Figure 4:
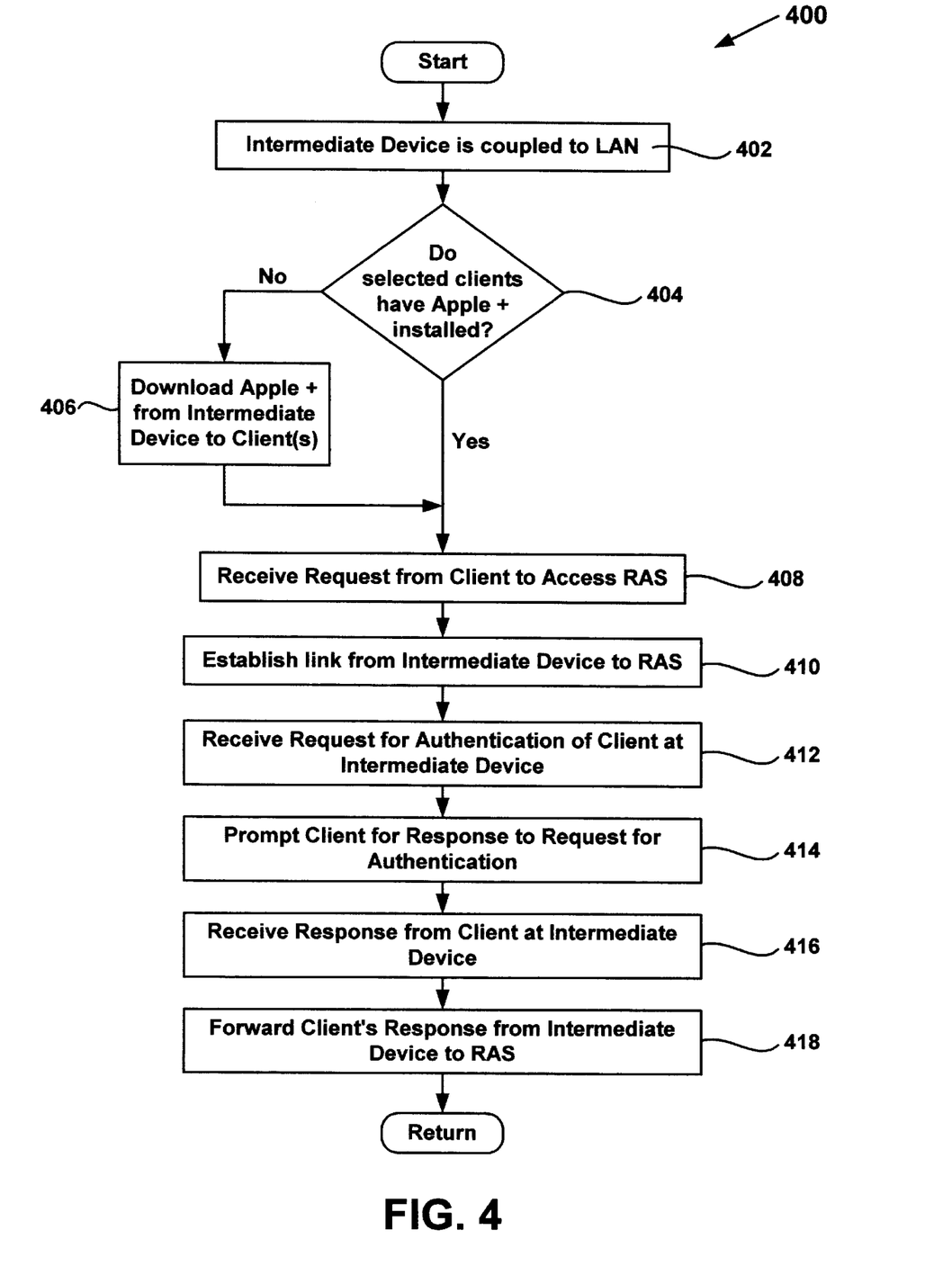
FIG. 4 is a flow chart of steps performed in accordance with one embodiment of the present claimed invention.

With reference next to FIG. 4, a flow chart 400 of exemplary steps used by the present invention is shown. Flow chart 400 includes processes of the present invention which, in one embodiment, are carried out by a processor under the control of computer-readable and computer-executable instructions. The computer-readable and computer-executable instructions reside, for example, in data storage features such as computer usable volatile memory 106 and/or computer usable non-volatile memory 108 of FIG. 1. The computer-readable and computer-executable instructions are used to control or operate in conjunction with, for example, central processing unit 104 of FIG. 1. As mentioned above, the features of the computer system of FIG. 1 are well suited to being disposed, for example, in intermediate device 210 and/or clients 202, 204, and 206. Although specific steps are disclosed in flow chart 400 of FIG. 4, such steps are exemplary. That is, the present invention is well suited to performing various other steps or variations of the steps recited in FIG. 4.

In step 402 of FIG. 4, in one embodiment of the present invention, intermediate device 210 of FIGS. 2 and 3, is coupled to LAN 218 of FIG. 2. In so doing, intermediate device 210 is able to communicate with clients 202, 204, and 206 of FIG. 2. As mentioned above, in the present embodiment, intermediate device 210 is a NAT. Additionally, in the present embodiment, intermediate device 210 has a deliverable security applet stored in memory 302 thereof. In the present embodiment, the deliverable security applet is adapted to run on multiple client operating systems. That is, unlike prior art Terminate-and-Stay-Resident programs, the present deliverable security applet is initially stored in the memory of intermediate device 210, and the present deliverable security applet is not specifically written for any particular client environment or client operating system. That is, in one embodiment, the present invention takes advantage of JAVA which runs on the JAVA Virtual Machine. Hence, the JAVA applet is independent of the client operating system.

Referring now to step, 404 the present embodiment determines whether selected clients 202, 204, and 206 have the deliverable security applet installed thereon. In the present embodiment, the deliverable security applet is executable on a browser program running on clients 202, 204, and 206. Thus, in the present embodiment, clients 202, 204, and 206 have a browser program running thereon. If the selected clients 202, 204, and 206 already have the deliverable security applet running thereon, the present embodiment proceeds to step 408. If the selected clients 202, 204, and 206 do not have the present deliverable security applet loaded thereon the present invention proceeds to step 406.

At step 406, the present embodiment downloads the present deliverable security applet from memory 302 of intermediate device 210 to the desired clients 202, 204, and 206 via downloader 304 of FIG. 3. Thus, unlike prior art approaches which require that a special application be loaded directly onto each client by a user, the present embodiment downloads the present deliverable security applet directly from intermediate device 210 onto a selected client or clients. Thus, even an unsophisticated consumer is able to load the present deliverable security applet onto a selected client simply by coupling intermediate device 210 to LAN 208.

With reference still to step 406, as mentioned above, the present deliverable security applet is not specifically written for any particular client environment or client operating system. Thus, the present deliverable security applet eliminates the need to write and install on each client a unique version of a special application. Therefore, the present invention does not require a user to monitor each client environments and install (and/or update) the versions of special application. Instead, the present deliverable security applet functions regardless of the operating system of the client.

Referring still to step 406, in the present embodiment, deliverable security applet is a JAVA applet which executes on a browser program running on the client. The present deliverable security applet causes the client to be prompted to respond to requests for authentication of the client when such requests for authentication are received by intermediate device 210. Additionally, the present embodiment is also well suited to downloading the present deliverable security applet to a selected at least one of a plurality of clients 202, 204, and 206. That is, a user of intermediate device 210 is able to selectively download the present deliverable security applet from intermediate device 210 to only a desired client or clients. In such a case, a user configures intermediate device 210 using, for example, user interface 306, such that the present deliverable security applet is downloaded only to the desired client or clients.

At step 408, a client 202, 204, or 206, seeks to access RAS 218. This occurs, for example, when the client 202, 204, or 206 sends non-local data which results in a call being placed to RAS 216 so that the internet can be accessed.

Next, at step 410, intermediate device 210 establishes a link between intermediate device 210 and RAS 216 via single connection 212 and WAN 214.

Referring now to step 412, after the link was established at step 410, RAS 216 sends a request for authentication of the client. The request for authentication sent from RAS 216 is then received at intermediate device 210. However, the authentication information is not present at intermediate device 210. Instead, the authentication information must be provided by the appropriate client or a user thereof. One example of an authentication requires that the user of the client carry a token and be aware of an associated personal identification number (PIN). The token generates a time-variable identification number. RAS 216 will know which identification number should be generated by the token at a particular time. The user then enters the PIN as well as the token generated identification number into the client and transmits this information to requesting RAS 216 for authentication. In so doing, RAS 216 is able to determine whether the client or user thereof has authorization to access RAS 216. Although such an authentication method is recited in the present embodiment, the present invention is also well suited to use with various other authentication methods and techniques.

Thus, at step 414, intermediate device 210 causes the present deliverable security applet, loaded onto the client, to prompt the user for the PIN as well as the identification number generated by the token.

Next, at step 416, the client then forwards the client's authentication information (e.g. identification number, password, and the like) to intermediate device 210.

Then, at step 418, the present embodiment forwards the client's authentication information (e.g. identification number, password, and the like) from intermediate device 210 to RAS 216. As a result, RAS 216 is able to determine whether or not the client has authorization to access RAS 216, and RAS 216 then grants or denies access accordingly. Thus, even an unsophisticated consumer is able provide authentication response capability for one or more desired clients simply by coupling intermediate device 210 of the present embodiment to LAN 208.

In some instances, RAS 216 or other destination address will periodically request new authentication information. That is, in some instances a request for authentication information may be sent from RAS 216, for example, every 30 minutes. In such an example, the present invention will repeat steps 412 through 418 as needed. Note that future authentication may require both the PIN as well as the identification number generated by the token to be entered. Alternatively, it may only require the identification number to be entered.

Additionally, in some instances new clients will be added to LAN 208 once LAN 208 is already coupled to intermediate device 210. The operation of one embodiment of the present invention in such an instance is set forth in flow chart 500 of FIG. 5. In step 502 of FIG. 5, a new client is coupled to LAN 218 of FIG. 2.

Figure 5:
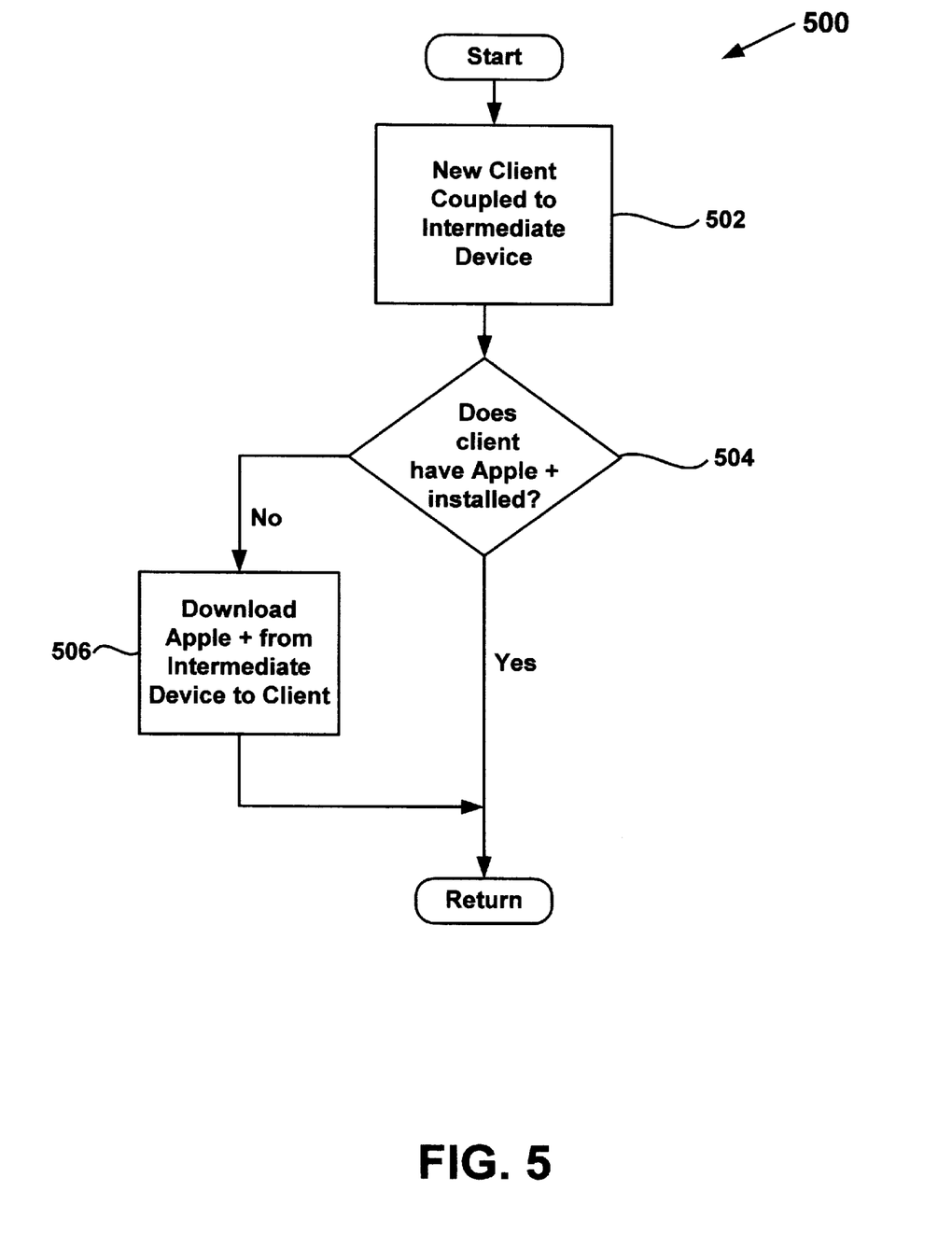
FIG. 5 is a flow chart of steps performed in accordance with one embodiment of the present claimed invention.

Referring now to step, 504 the present embodiment determines whether the new client has the deliverable security applet installed thereon. If the new client already has the deliverable security applet running thereon, the present embodiment proceeds, for example to step 408 of FIG. 4. If the new client does not have the present deliverable security applet loaded thereon the present invention proceeds to step 506.

At step 506, the present embodiment downloads the present deliverable security applet from memory 302 of intermediate device 210 to the new client via downloader 304 of FIG. 3. Thus, unlike prior art approaches which require that a special application be loaded directly onto each new client by a user, the present embodiment downloads the present deliverable security applet directly from intermediate device 210 onto each new client or clients as they are added. Thus, even an unsophisticated consumer is able to load the present deliverable security applet onto a newly added client simply by coupling the new client to LAN 208.

Thus, the present invention provides a method and system for providing security during use of an intermediate device wherein the method and system allows a user of a client to be prompted for authentication information. The present invention also provides a method and system which meets the above-listed need and which is independent of the operating system environment of the client to be authenticated. The present invention further provides a method and system which meets the above listed needs and which does not require extensive consumer intervention or consumer sophistication.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, to thereby enable others skilled in the art best to utilize the invention and various embodiments with various modifications suited to the particular use contemplated. It is intended that the scope of the invention be defined by the claims appended hereto and their equivalents.

What is claimed is:

1. A system for providing security during use of an intermediate device which represents clients to a central site, said system comprising:
   an intermediate device, said intermediate device including memory adapted to a store a deliverable security applet, said intermediate device configured to download said deliverable security applet to a desired location; and
   a client coupled to said intermediate device, said client adapted to receive said deliverable security applet from said intermediate device when said intermediate device downloads said deliverable security applet to said client such that said client can be prompted to respond to requests for authentication of said client when said requests for authentication of said client are received by said intermediate device.

2. The system of claim 1 for providing security during use of an intermediate device wherein said intermediate device is a Network Address Translator (NAT).

3. The system of claim 1 for providing security during use of an intermediate device wherein said deliverable security applet is adapted to run on multiple client operating systems.

4. The system of claim 1 for providing security during use of an intermediate device wherein said deliverable security applet is a JAVA applet.

5. The system of claim 1 for providing security during use of an intermediate device wherein said deliverable security applet executes on a browser program running on said client.

6. The system of claim 1 for providing security during use of an intermediate device wherein said deliverable security applet is adapted to prompt a user of said client for authentication information when said requests for authentication of said client are received by said intermediate device.

7. The system of claim 1 for providing security during use of an intermediate device wherein said intermediate device is further adapted to download said deliverable security applet to a selected at least one of a plurality of said clients.

8. An intermediate device adapted for providing authentication of a client coupled to said intermediate device, said intermediate device comprising:
   memory adapted to a store a deliverable security applet, said intermediate device configured to download said deliverable security applet to a desired client such that said client can be prompted to respond to requests for authentication of said client when said requests for authentication of said client are received by said intermediate device.

9. The intermediate device of claim 8 adapted for providing authentication of a client coupled to said intermediate device wherein said intermediate device is a Network Address Translator (NAT).

10. The intermediate device of claim 8 adapted for providing authentication of a client coupled to said intermediate device wherein said deliverable security applet is adapted to run on multiple client operating systems.

11. The intermediate device of claim 8 adapted for providing authentication of a client coupled to said intermediate device wherein said deliverable security applet is a JAVA applet.

12. The intermediate device of claim 8 adapted for providing authentication of a client coupled to said intermediate device wherein said deliverable security applet executes on a browser program running on said client.

13. The intermediate device of claim 8 adapted for providing authentication of a client coupled to said intermediate device wherein said deliverable security applet is adapted to prompt a user of said client for authentication information when said requests for authentication of said client are received by said intermediate device.

14. The intermediate device of claim 8 adapted for providing authentication of a client coupled to said intermediate device wherein said intermediate device is further adapted to download said deliverable security applet to a selected at least one of a plurality of said clients.

15. A method for providing authentication of a client coupled to an intermediate device, said method comprising the steps of:
   a) storing a deliverable security applet in memory of an intermediate device; and
   b) downloading said deliverable security applet to a desired client such that said client can be prompted to respond to requests for authentication of said client when said requests for authentication of said client are received by said intermediate device.

16. The method for providing authentication of a client coupled to an intermediate device as recited in claim 15 wherein step a) comprises:

storing said deliverable security applet in memory of a Network Address Translator (NAT).

17. The method for providing authentication of a client coupled to an intermediate device as recited in claim 15 wherein step a) comprises:

storing a deliverable security applet in memory of an intermediate device wherein said deliverable security applet is adapted to run on multiple client operating systems.

18. The method for providing authentication of a client coupled to an intermediate device as recited in claim 15 wherein step a) comprises:

storing a deliverable security JAVA applet in memory of an intermediate device.

19. The method for providing authentication of a client coupled to an intermediate device as recited in claim 15 wherein step a) comprises:

storing a deliverable security applet in memory of an intermediate device wherein said deliverable security applet is executable on a browser program running on a client.

20. The method for providing authentication of a client coupled to an intermediate device as recited in claim 15 wherein step b) comprises:

downloading said deliverable security applet to a desired client such that a user of said client can be prompted to respond to requests for authentication of said client when said requests for authentication of said client are received by said intermediate device.

21. The method for providing authentication of a client coupled to an intermediate device as recited in claim 15 wherein step b) comprises:

downloading said deliverable security applet to a selected at least one of a plurality of said clients.

22. In a computer system having a processor coupled to a bus, a computer readable medium coupled to said bus and having stored therein a computer program that when executed by said processor causes said computer system to implement a method for providing authentication of a client coupled to an intermediate device, said method comprising the steps of:

a) storing a deliverable security applet in memory of an intermediate device; and
b) downloading said deliverable security applet to a desired client such that said client can be prompted to respond to requests for authentication of said client when said requests for authentication of said client are received by said intermediate device.

23. A computer readable memory unit as described in claim 22 wherein step a) of said computer implemented method stored on said computer readable medium further comprises:

storing said deliverable security applet in memory of a Network Address Translator (NAT).

24. A computer readable memory unit as described in claim 22 wherein step a) of said computer implemented method stored on said computer readable medium further comprises:

storing a deliverable security applet in memory of an intermediate device wherein said deliverable security applet is adapted to run on multiple client operating systems.

25. A computer readable memory unit as described in claim 22 wherein step a) of said computer implemented method stored on said computer readable medium further comprises:

storing a deliverable security JAVA applet in memory of an intermediate device.

26. A computer readable memory unit as described in claim 22 wherein step a) of said computer implemented method stored on said computer readable medium further comprises:

storing a deliverable security applet in memory of an intermediate device wherein said deliverable security applet is executable on a browser program running on a client.

27. A computer readable memory unit as described in claim 22 wherein step b) of said computer implemented method stored on said computer readable medium further comprises:

downloading said deliverable security applet to a desired client such that a user of said client can be prompted to respond to requests for authentication of said client when said requests for authentication of said client are received by said intermediate device.

28. A computer readable memory unit as described in claim 22 wherein step b) of said computer implemented method stored on said computer readable medium further comprises:

downloading said deliverable security applet to a selected at least one of a plurality of said clients.

* * * * *